Figure 1:
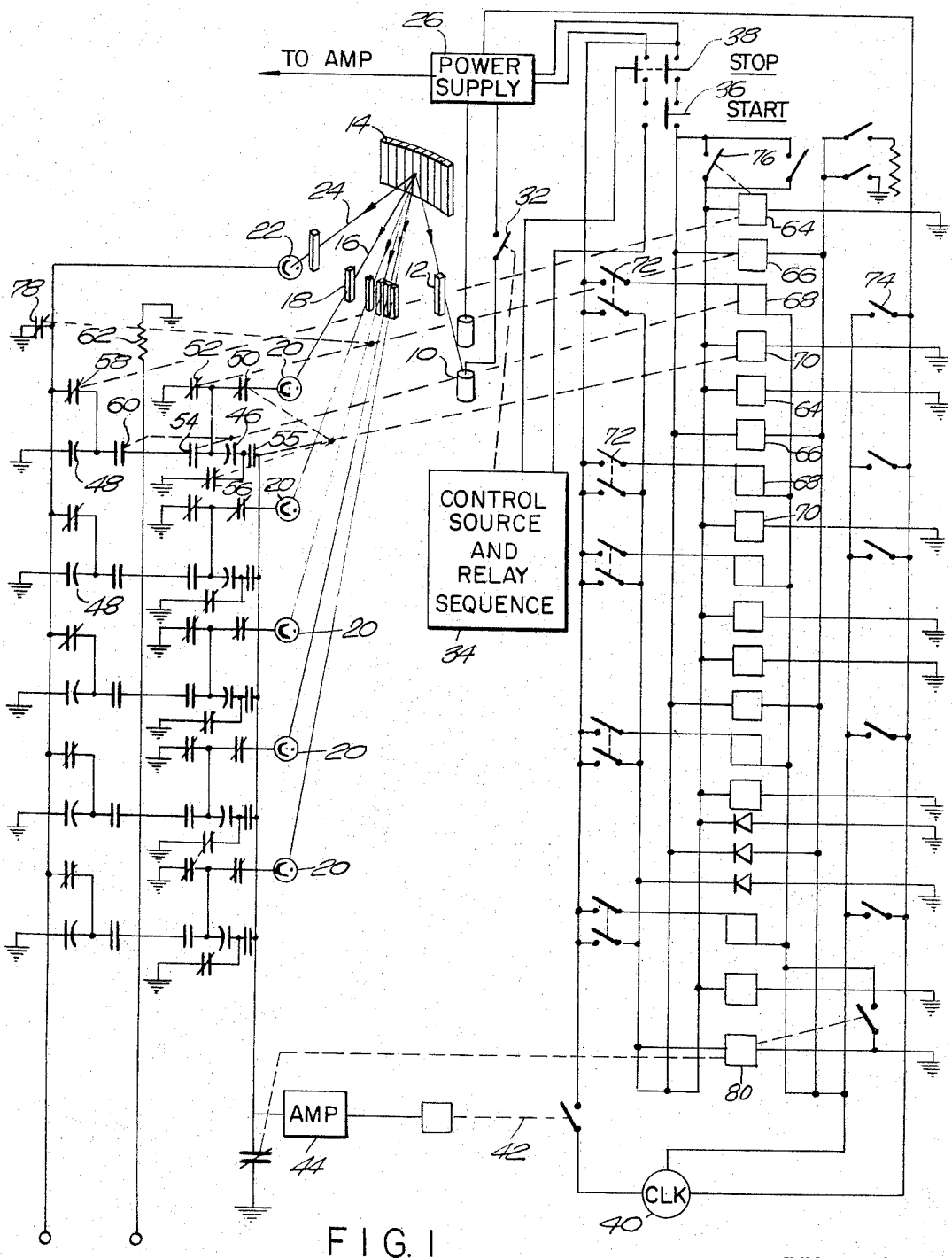

INVENTOR.
DONALD J. PRICE

Aug. 22, 1967 D. J. PRICE 3,337,738
MANUALLY OPERATED SEQUENTIAL LOGARITHMIC
SPECTROMETER READOUT SYSTEM
Filed June 16, 1964 2 Sheets-Sheet 2

INVENTOR.
DONALD J. PRICE
BY
Morse, Altman & Oates
ATTORNEYS

United States Patent Office 3,337,738
Patented Aug. 22, 1967

3,337,738
MANUALLY OPERATED SEQUENTIAL LOGARITHMIC SPECTROMETER READOUT SYSTEM
Donald J. Price, Boston, Mass., assignor to Baird-Atomic, Inc., Cambridge, Mass., a corporation of Massachusetts
Filed June 16, 1964, Ser. No. 375,491
9 Claims. (Cl. 250—226)

This invention relates generally to spectrometer readout systems and more particularly is directed towards a new and improved sequential logarithmic readout system for a direct reading spectrometer.

In general, a direct reading spectrometer is an apparatus which automatically indicates the chemical composition of a specimen by determining the intensity distribution of radiation of characteristic wavelengths emitted by the specimen under excitation. Typically, a direct reading spectrometer comprises an entrance slit that transmits radiation from an electrically excited specimen against a diffraction grating that disperses the radiation into a spectrum. The spectrometer also includes a plurality of exit slits arrayed at selected spaced intervals for transmitting the radiation of preselected wavelengths to photocell channels in order to determine the differing intensities of the radiation at these wavelengths.

An automatic spectrometer readout system usually employs photocell channels including capacitors which build up charges corresponding to the intensity of the monitored wavelengths. The readout is obtained by comparing the charge on the measuring capacitor with the charge on a reference capacitor. This measurement is usually accomplished by either a direct comparison technique which is linear, or a logarithmic discharge technique.

Two common problems associated with most linear readouts, namely analytical curve rotation and dependence of the error (in the analysis) upon the concentration, are avoided with a logarithmic discharge measurement. Spectrometers are available with the analytical data presented either serially (sequentially) or simultaneously (parallel). With a serial readout, the data is available one element at a time, usually in a preset order, while a simultaneous presentation yields all information at one time. These two readout modes have inherent advantages that usually depend upon the individual requirements. For example, the simultaneous type readout allows the operator to rapidly scan the indicators and record those of interest in any order. Also, an indicator may be looked at a second time in case of doubt. This type of readout is considered to be the fastest manually operated system available and can operate on a logarithmic discharge basis.

In contrast, a serial readout is less expensive but somewhat lower than the simutaneous presentation type. However, the results obtained are of the same quality although the system is not generally as flexible. Also, heretofore, serial readouts have been confined to linear capacitor measurement modes.

Accordingly, it is an object of the present invention to provide improvements in spectrometer readout systems.

Another object of this invention is to provide a sequentially operated spectrometer readout system in which the readout is logarithmically related to the concentration of the measured element.

Still another object of this invention is to provide an improved mode of operation for the photomultiplying tubes in a spectrometer readout system.

More particularly, this invention features a sequential logarithmic readout system for a direct reading spectrometer, comprising a plurality of phototubes adapted to generate a current when exposed to the spectrum of the specimen being examined. Associated with each of the phototubes is a capacitor which, when placed in circuit with its related phototube will build up a charge of an unknown quantity corresponding to the intensity of the particular wavelength being examined. Also associated with each of the phototubes is a reference capacitor which is charged from a single phototube exposed to a wavelength from a major component of the examined specimen. All reference capacitors will assume identical charges whereas the measuring capacitors will assume different and unknown charges corresponding to each monitored wavelength.

The system is operated by sequentially comparing the charge on a reference capacitor to the charge on a measuring capacitor to determine the difference in the two charges. In comparing the charges on the two capacitors, a resistance is placed across the reference capacitor to bleed the voltage down logarithmically. A null detecting system is employed to drive a clock or counting device for the period it takes to discharge the reference capacitor to a point where its charge matches that of the measuring capacitor. The resulting readout is a logarithmic representation of the concentration monitored by the particular phototube.

As another feature of this invention, the phototubes are exposed to the excited specimen during the pre-burn stage of operation so as to precondition each tube to the exact same light level and wavelength that it will be required to measure during the exposure period. The initial output of the phototube during the preconditioning period is bled to ground and the measuring capacitors are switched into circuit with the phototubes for the exposure period only after the tubes have been preconditioned.

Figure 2:
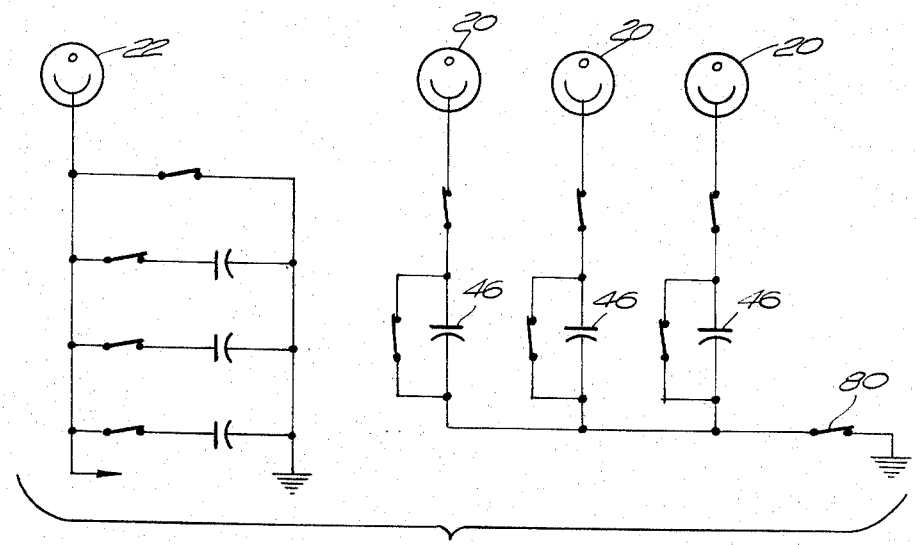
Figure 3:
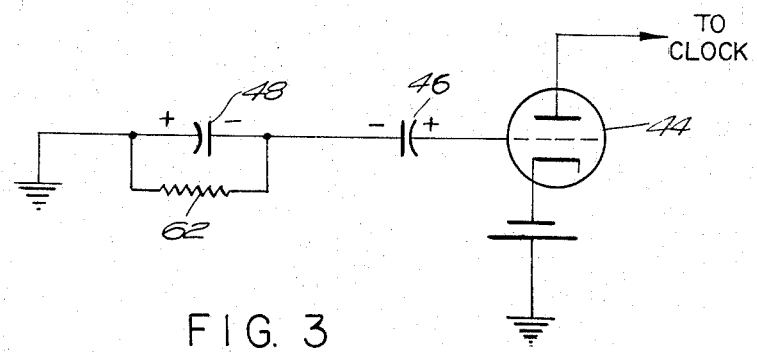

But these and other features of the invention, along with further objects and advantages thereof, will become more fully apparent from the following detailed description of a preferred embodiment of the invention, with reference being made to the accompanying drawings, in which:

FIG. 1 is a schematic view showing a sequential logarithmic readout system for a direct reading emission spectrometer made according to the invention, FIG. 2 is a circuit diagram showing in simplified form the reference and measuring portions of the system, and FIG. 3 is a simplified diagram showing the reference and measuring capacitors in a discharging mode.

Referring now to the drawings, the reference character 10 generally indicates an electrically excited gap in which a specimen is placed for excitation. The resulting radiation is passed through an entrance slit 12 against a curved diffraction grating 14 which disperses the radiation into a spectrum, rays of which are shown at 16. These spectral components pass through a plurality of exit slits 18 distributed in predetermined spaced relation in an arc opposite the grating for transmitting isolated wavelengths of the spectrum. A bank of photocells 20 are provided to receive wavelengths 16 with a photocell 22 being positioned to receive a reference spectrum line 24. The sequence of photocells 20 are positioned to receive the spectrum lines 16 and each of the photocells generate a signal for a wavelength intensity comparison which will be described below.

This spectrometer is of the type more specifically described in U.S. Patent 2,937,561.

The spark gap 10 is energized by means of a suitable power supply 26 through leads 28 and 30 interrupted by a relay switch 32. This switch is operated by means of a timer control 34 generally indicated in block form. This control is connected to the power supply through switches 36 and 38 which are employed to start up or turn off the apparatus.

The power supply 26 also energizes a clock 40 or other suitable readout device the operation of which is controlled by means of a relay 42 under the control of a null detecting trigger amplifier 44. This amplifier is also energized by the power source 26 but is controlled by means of a sequence of measuring capacitors 46 and reference capacitors 48.

The measuring capacitors 46 are charged individually each by single phototube 20 while the reference capacitors 48 are all charged by the same phototube, namely, reference phototube 22. It will thus be understood that the reference capacitors 48 each will have an identical charge corresponding to the intensity of the reference line 24 as monitored by the phototube 22. In practice, the reference line 24 will be of a wavelength corresponding to a major component of the specimen under excitation. The measuring capacitors 46, on the other hand, each will have an unknown charge and these charges may vary from one capacitor to the next depending upon the intensity of the particular wavelength monitored by the associated phototube 20. While in the illustrated embodiment only five measuring phototubes and associated capacitors are illustrated, it will be understood that this is only by way of illustration and any number may employed in a given system to provide whatever monitoring channels are required. In view of the fact that each measuring channel is identical in design and operation, only one channel will be described.

Each channel comprises a measuring phototube 20, a measuring capacitor 46 and associated relay switches 50, 52, 54, 55 and 56. Arranged in parallel with each measuring capacitor is a reference capacitor 48 which forms part of the measuring channel and includes relay switches 58 and 60. A reference capacitor discharge resistor 62 is connected across all of the reference capacitors.

The various relay switches in each channel are operated by associated coils illustrated on the right-hand side side of FIG. 1. Each channel includes coils 64, 66, 68 and 70. The coil 64 is connected to the relay switch 58, the coil 66 is connected to the relay switch 52 and relay switch 78 located between the reference phototube 22 and ground, the coil 68 is connected to the relay switches 54 and 60 and the coil 70 is connected to the relay switches 50, 55 and 56. Operation of each channel is controlled by means of a manually operated double-pole measuring switch 72 which also incorporates a reset switch 74.

The system is cycled by the operator loading his sample in the usual manner and pressing the start button 36. This will energize the timer control 34 which in turn will close the switch 32 to excite the specimen. No shutter is used in the system and the source light immediately causes an output current flow from all photomultiplying tubes 20 and 22 on which a spectrum line impinges. As shown in FIG. 1 switches 50 and 52 for each photomultiplying tube 20 are closed so that all measuring capacitors 46 are shorted and the output current from the tube flows to ground.

It should be noted that this current is effectively at the same levels as that which will be collected in the capacitors during the exposure. By allowing the phototubes to be exposed during the pre-burn period, the tubes are preconditioned for the same exact light level that they subsequently will be required to measure. The phototube conditioning time which lasts for the length of the pre-burn stabilizes the tubes after their quiescent period of total darkness. This arrangement insures improved operation of the phototubes over prior systems in which shutters were employed to expose the tube only during the actual measuring period. Under prior practice with regular fatiguing of the tubes, the light may be too strong for some tubes and too weak for others in addition to being of a different wavelentgh.

When the pre-burn timer expires, the exposure timer starts. This unshorts the measuring capacitors 46 and they begin a smooth voltage integration buildup. Unshorting of the measuring capacitors is accomplished by the relay coil 64 opening the relay switch 58 and closing relay switch 76. At the same time relay coil 66 opens a relay switch 78 between the reference phototube 22 and ground and relay swttch 52 between measuring phototubes 20 and ground. In this condition, all reference capacitors 58 are in parallel during exposure and the resulting voltage is the same for all since they are charged by the single reference phototube 22. The individual measuring capacitors 46 accumulate voltages proportional to the concentrations of the unknown elements of the sample as monitored by their associated measuring phototubes 20.

When the exposure timer expires, it trips a built-in double set of contacts which first disconnect all the phototube outputs from the capacitors and shunts these currents to ground, then, about ½ a second later, turns off the source of operation by opening the switch 32. This insures a spectrographically clean end of the exposure.

With both the reference and the measuring capacitors charged and isolated, the system is now ready for the operator to readout each of the channels sequentially. Reference is made to FIG. 2 which shows in simplified form the condition of the reference phototube and capacitors and the measuring phototubes and capacitors where it will be seen that the shorting relays are opened and the capacitors are charged.

The operator commences reading the first unknown element by closing the double pole switch 72 for the particular channel which is to be read. This will actuate the relay 68 closing switches 54 and 60 to disconnect the reference capacitor 48 from its parallel string and reconnect it in series with the measuring capacitor 46 of this particular channel. The single discharge resistor 62 is thus connected across the reference capacitor 48 as shown in simplified form in FIG. 3. In this condition, the voltage on the reference capacitor 48 begins bleeding down logarithmically. As the capacitor 48 discharges, it actuates the null detecting trigger amplifier 44 which in turn actuates the relay 42 to start the clock 40.

The amplifier 44 has been placed in an operational mode before the charged capacitors are presented to it for measurement. This is done by means of a feedback relay 80. It will be noted that one set of contacts for the switch 72 returns to ground through the contacts for the feedback relay switch 80 and the amplifier which is also energized by the switch 72. Thus, each measuring relay cannot actuate until after the feedback relay has closed.

Referring now more particularly to FIG. 3, the amplifier 44 will conduct as long as there is a difference in voltage between the reference capacitor and the measuring capacitor 46. When the measuring relay coil 68 is actuated by closure of the manual switch 72, the associated relay switch 54 allows the selected measuring capacitor negative side to connect with a common measuring line. The plus side of all measuring capacitors are wired together and are at ground potential during the exposure period through a normally closed contact in the feedback relay 80. This point is also connected to the first grid input stage of the trigger amplifier 44.

Thus, during the exposure period all measuring capacitors are being charged from their separate photomultiplier tubes to their common "plus" ground return. The relay coil 68 closes its associated switch 60 to tie the negative side of a reference matrix capacitor 48 to the common measuring line. This line has the reference capacitor discharge resistor 62 which typically is precision 20 megohm resistor which connects to ground. Thus, the action of the measuring relay which includes the coil 68 and the switches 54 and 60 is to provide the trigger amplifier 44 with the appropriate input to be measured.

The measuring capacitor 46 must be at a lower voltage than the reference capacitor 48 (for a normal analysis) so the amplifier 44 effectively sees a negative input which is the difference between these two capacitors. Since the discharge resistor 62 is now across the reference capacitor 48 directly, its voltage decreases according to the standard formula, $$T = RC \ln \frac{E}{E}$$

for logarithmic discharge where T is time in seconds; R is the resistance of the discharge resistor 62 in megohms; C is the capacitance of the measuring capacitor 46 in microfarads; ln is the natural logarithm; E is the capacitor voltage at the start of the discharge; and E is the capacitor voltage at time T.

The trigger amplifier 44 is adjusted so that when the voltage on the reference capacitor 48 exactly equals that on the associated measuring capacitor 46, it will instantly switch and actuate the relay 42 to stop the readout indicator or clock 40 which had started running when the measuring commenced. Thus, the indicator or clock 40 will register a number which corresponds to the logarithm of the ratio between the measuring capacitor 46 and the reference capacitor 48. Thus number is used in conjunction with a previously prepared calibration curve or chart to obtain the actual analysis of that particular element.

As the operator finishes recording each element reading, he depresses the individual reading switch 72 in the opposite direction so as to momentarily close the switch 74 thereby closing a contact for the reset circuit of the clock or indicator 40. This circuit immediately returns the clock to zero for the next element reading. This momentary reset period is also utilized to restabilize the null detecting amplifier 44. Since the feedback relay 80 is only energized when a switch 72 is closed in the reading direction, this relay is deenergized at all other times which allows the first stage input grid of the amplifier 44 to be at ground potential. With the inverse feedback circuit closed and the amplifier input at ground, the circuit is highly stable and will exhibit no drift while high energy spark source discharge is occurring in the immediate vicinity.

If any individual measuring capacitor should become charged to a voltage exceeding that of the reference capacitor, the system will automatically reject this reading with no effect on any of the other elements. Thus, no special precaution need be exercised when analyzing unknown samples since any time a measuring capacitor is charged too high, the indicator or clock will not run at all due to the positive rather than the negative gradient which will appear in the amplifier input. Since each unknown element has its own individual and isolated reference capacitor, any mutual voltage bleeding will only effect that one reference capacitor which will not be utilized anyway.

All measuring capacitors are completely and automatically discharged to zero voltage between each analytical cycle to insure that no residual potentials can remain to affect the next group of readings.

It will be understood that the operator may push each switch 72 for each channel in whatever sequence he desires to make the comparison between the reference capacitor and the measuring capacitor. Each time the switch for a particular channel is closed, the clock which has been reset after the prior reading starts again to measure the difference in voltage between the reference and measuring capacitors in the particular channel.

This cycle continues until the operator has interrogated all of the desired elements.

In practice, an individual capacitor will have a capacitance of 0.1 mf. for a total phototube load in a 16 element array of 1.6 mf. With a discharge resistor of 20 megohms there would be a time constant of 2 seconds. The programming of the system includes a pre-burn and exposure timer.

The advantage of employing a logarithmic discharge technique in spectro-chemical measurement is that the calibration curve never rotates as it can with a linear system. Thus, it is always possible to correct for day to day drifts with the addition or subtraction of a number which represents the difference between the actual and required figure for that analysis. Thus, it is possible to standardize for more than one alloy or type of a sample at one time to insure that the different numbers obtained can be applied to the calibration curve or chart. Another advantage is that only one standard sample is ever needed to correct the calibration curve for that alloy or sample type. Thus, routine standardization requires no more time than any usual analysis. The spectro-chemical method in general tends to have a rather constant relative accuracy for the quantitative determination of an element over a fairly wide range of concentration; for example, the absolute error in the determination of an element at 10% concentration is in general about 10 times as great as the absolute error at 1% concentration. The logarithmic scale is similar in this repect since it may be read with constant relative accuracy over the entire scale.

The system provides a relatively low cost yet highly versatile logarithmic readout. Its input is compatible with most direct readers and its serial output can be easily adapted to many forms of data presentation. These include the fast reset mechanical clock described, a digital presentation, magnetic or paper tape, sequential printer, electric typewriter and punched cards. Many of these readout modes are ideally suited to computer logic inputs. The output can also operate on a dual basis with the operator first manually reading the clock and then if desired actuate a permanent recorder of the type listed above.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patent of the United States is:

1. Spectroscopic apparatus, comprising
   (a) source means for exciting a specimen to emit radiation,
   (b) means for dispersing radiation from said source means into a spectrum,
   (c) a plurality of photoresponsive devices in register with selected components of said spectrum including a reference component for transducing said components into electrical signals.
   (d) a plurality of reference capacitors connected in parallel and associated with the photoresponsive device in register with said reference component and adapted to store identical charges when connected with said device,
   (e) a plurality of measuring capacitors associated with the remaining photoresponsive devices and adapted to store charges corresponding to the intensity of said components when connected with said devices,
   (f) programming means for connecting said capacitors to said devices for a predetermined time period to charge said capacitors,
   (g) recording means,
   (h) null detecting means operatively connected with said recording means,
   (i) resistance means, and
   (j) switching means for selectively connecting each of said measuring capacitors in series with an associated reference capacitor and said null detecting means and also for connecting said resistance means across said reference capacitor to thereby logarithnically discharge said reference capacitor, said null detecting means being adapted to actuate said recording means while there is a voltage difference between said reference and measuring capacitors.

2. Spectroscopic apparatus according to claim 1 wherein each of said photoresponsive devices is positioned for continuous and unobstructed exposure to its related spectral component and automatic switching means connetced to said devices for switching the output from said devices from ground to said capacitors and back to ground.

3. Spectroscopic apparatus according to claim 1 including means for energizing said null detecting means prior to connecting said capacitors thereto.

4. Spectroscopic apparatus according to claim 1 wherein said null detecting means is a null detecting trigger amplifier adapted to conduct only with a negative input thereto.

5. Spectroscopic apparatus according to claim 1 wherein said recording means is a clock.

6. Spectroscopic apparatus according to claim 1 including a reset switch associated with said switching means for returning said recording means to a start position.

7. Spectroscopic apparatus, comprising
 (a) source means for exciting a specimen to emit radiation,
 (b) means for dispersing radiation from said source means into a spectrum,
 (c) a plurality of photoresponsive devices in register with selected components of said spectrum including a reference component for transducing said components into electrical signals,,
 (d) a plurality of reference capacitors connected in parallel and associated with the photoresponsive device in register with said reference component and adapted to store identical charges when connected with said device,
 (e) a plurality of measuring capacitors associated with the remaining photoresponsive devices and adapted to store charges corresponding to the intensity of said components when connected with said devices,
 (f) programming means for first energizing said source means and connecting said devices to ground, secondly connecting said capacitors to said devices to charge said capacitors, thirdly disconnecting said devices from said capacitors and reconnecting said devices with ground and fourthly deenergizing said source means,
 (g) recording means,
 (h) null detecting means operatively connected with said recording means,
 (i) resistance means, and
 (j) switching means for selectively connecting each of said measuring capacitors in series with an associated reference capacitor and said null detecting means and also connecting said resistance means across said reference capacitor to thereby discharge said reference capacitor logarithmically, said null detecting means being adapted to operate said recording means while there is a voltage difference between said reference and measuring capacitors.

8. Spectroscopic apparatus, comprising
 (a) source means for exciting a specimen to emit radiation,
 (b) entrance slit means for transmitting said radiation from said source means,
 (c) diffracting means for dispersing radiation from said entrance slit means into a spectrum,
 (d) exit slit means for transmitting selected components including a reference component of said radiation from said diffracting means,
 (e) a plurality of photoresponsive devices in register with said exit slit means for transducing said components into electrical signals.
 (f) a plurality of reference capacitors connected in parallel and associated with the photoresponsive device in register with said reference component and adapted to store identical charges when connected with said device,
 (g) a plurality of measuring capacitors associated with the remaining photoresponsive devices and adapted to store charge corresponding to the intensity of said components when connected wtih said devices,
 (h) control means for first energizing said source means and connecting said devices to ground and secondly connecting said capacitors to said devices to charge said capacitors and thirdly disconnecting said devices from said capacitors and reconnecting said devices with ground and fourthly deenergizing said source means,
 (i) a recorder,
 (j) a null detecting amplifier operatively connected with said recorder,
 (k) a resistance element and
 (l) switching means for selectively connecting each of said measuring capacitors in series with a reference capacitor and said amplifier and also connecting said resistance element across said reference capacitor to thereby discharge said reference capacitor logarithmically to ground, said amplifier being adapted to conduct and operate said recorder while there is a voltage difference between said reference and measuring capacitors.

9. In a direct reading spectrometer having a photocell for observing the intensity of a spectral line and a condenser for storing the output of said photocell during a selected period, means for preconditioning said photocell prior to said period, comprising:
 (a) switching means operatively connected to said photocell, said condenser and ground, and
 (b) timing means operatively connected to said switching means for first connecting said photocell to ground for a period of sufficient duration to stabilize said photocell and secondly connecting said photocell to said condenser during said selected period and thirdly reconnecting said photocell to ground.

References Cited
UNITED STATES PATENTS 3,227,038  1/1966  Earle _____ 88—14
3,229,566  1/1966  Hutchinson et al. ____ 250—226

RALPH G. NILSON, *Primary Examiner.*

M. ABRAMSON, *Assistant Examiner.*